US007899036B2

(12) United States Patent
Shen

(10) Patent No.: US 7,899,036 B2
(45) Date of Patent: Mar. 1, 2011

(54) ASSIGNMENT OF A SERVING ENTITY IN A COMMUNICATION SYSTEM

(75) Inventor: Jiadong Shen, München (DE)

(73) Assignee: Nokia Siemens Networks Oy, Espoo (FI)

( * ) Notice: Subject to any disclaimer, the term of this patent is extended or adjusted under 35 U.S.C. 154(b) by 322 days.

(21) Appl. No.: 12/232,172

(22) Filed: Sep. 11, 2008

(65) Prior Publication Data

US 2009/0092061 A1 Apr. 9, 2009

(30) Foreign Application Priority Data

Sep. 14, 2007 (EP) .................................. 07018117

(51) Int. Cl.
*H04L 12/66* (2006.01)
(52) U.S. Cl. ....... 370/352; 370/338; 370/401; 455/435.1
(58) Field of Classification Search .................. None
See application file for complete search history.

(56) References Cited

U.S. PATENT DOCUMENTS

| 2005/0078642 | A1* | 4/2005 | Mayer et al. .................. 370/338 |
| 2010/0217875 | A1* | 8/2010 | Belinchon Vergara et al. ................. 709/228 |
| 2010/0223326 | A1* | 9/2010 | Noldus et al. ................. 709/203 |

FOREIGN PATENT DOCUMENTS

WO WO 2006/016839 A1 2/2006

OTHER PUBLICATIONS

3GPP TS 23.228 V8.1.0, $3^{rd}$ Generation Partnership Project; Technical Specification Group Services and System Aspects; IP Multimedia Subsystem (IMS); Stage 2 (Release 8), Jun. 2007, a total of 226 pages.
XP-002470754 3GPP CT WG4 Meeting #36, "Discussion on the Failure of the S-CSCF", C4-071026, Aug. 20-24, 2007, pp. 1-11.
XP-002430231 3GPP TSG-CT-1 Meeting #40, "Reassignment of S-CSCF During Terminating Call Procedure", C1-051456, Oct. 31-Nov. 4, 2005, pp. 1-2.
ETSI TS 129 228 V7.3.0, Digital Cellular Telecommunications System (Phase 2+); Universal Mobile Telecommunications System (UMTS); IP Multimedia (IM) Subsystem Cx and Dx Interfaces; Signalling Flows and Message Contents (3GPP TS 29.228 version 7.3.0 Release 7), Sep. 2006, pp. 1-59.
ETSI TS 23.228 V8.0.0, 3rd Generation Partnership Project; Technical Specification Group Services and System Aspects; IP Multimedia Subsystem (IMS); Stage 2 (Release 8), Mar. 2007, pp. 1-224.

* cited by examiner

*Primary Examiner* — Duc C Ho
(74) *Attorney, Agent, or Firm* — Squire, Sanders & Dempsey (US) LLP

(57) ABSTRACT

The present invention relates to assigning an S-CSCF to an un-registered user in an IMS network. A HSS maintains information about a registration state of users and about assignments of S-CSCF to the users. HSS determines if S-CSCFs are available to serve the users. When receiving a request associated with a user and requesting address of an S-CSCF assigned to the user, assignment of the S-CSCF for the user is removed from HSS if the S-CSCF has been determined not to be available and if the registration state of the user indicates that the user is not registered. The HSS may transmit Server Capabilities to an I-CSCF to enable the I-CSCF to re-select new S-CSCF to serve the user.

17 Claims, 4 Drawing Sheets

US 7,899,036 B2

ASSIGNMENT OF A SERVING ENTITY IN A COMMUNICATION SYSTEM

TECHNICAL FIELD OF THE INVENTION

The invention relates to a method of assigning a serving entity to an un-registered user in a communication system and to a system, register entity and control entity for the same.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Diameter protocol has been defined by IETF and is intended to provide an Authentication, Authorization and Accounting (AAA) framework for applications such as network access or IP mobility.

Before being able to establish of a communication session, a user has to register to the IMS network. The basic IMS registration procedure is described in subclause 5.2.2.3 of 3GPP specification TS 23.228.

Different types network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF actually handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing SIP registration and routing SIP requests received from another network towards the S-CSCF. The S-CSCF performs the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF provides services to registered and unregistered users when it is assigned to these users. This assignment is stored in the Home Subscriber Server (HSS). An example of a service that is provided by the IMS network for unregistered users is voice mail. The voice mail service enables callers to leave a voice message for a callee (to whom the call was made) who was not reachable for some reason, e.g. not being registered to the network.

The HSS is the master database for a given user. It is the entity containing the subscription-related information to support the network entities actually handling calls/sessions. As an example, the HSS provides support to the call control servers (CSCFs) in order to complete the routing/roaming procedures by solving authentication, authorisation, naming/addressing resolution, location dependencies, etc.

The HSS is responsible for holding the following user related information:

User Identification, Numbering and addressing information;
User Security information: Network access control information for authentication and authorization;
User Location information at inter-system level: the HSS supports the user registration, and stores inter-system location information, etc.;
User profile information.

Mechanisms at the network element layer like cluster solution may be used to improve the reliability of the S-CSCF. Failover mechanisms may be introduced also at the network layer to ensure the availability of the network service. Therefore S-CSCF re-assignment shall be possible if the assigned S-CSCF is not available.

Currently, for unregistered users, the assignment of the S-CSCF will happen when the first SIP request for an unregistered user arrives at an S-CSCF. This S-CSCF will then treat the user as an unregistered user and try to download the user profile from the HSS using Server-Assignment-Request (SAR). SAR request is a Diameter command message that a Diameter multimedia client sends to a Diameter multimedia server to request the server to store the name of the server (the S-CSCF) that is currently serving the user. The interface between the S-CSCF and the HSS is called Cx interface. If no S-CSCF is assigned to this user at this moment, the HSS will then assign an S-CSCF to this user and provide the user profile to the S-CSCF using Diameter Server-Assignment-Answer (SAA) response over Cx interface.

However, the S-CSCF re-assignment is not possible for unregistered users. If an S-CSCF was already assigned to an unregistered user, the HSS will reject the Cx-SAR request received from another S-CSCF. Thereby, when the currently assigned S-CSCF is not available for an unregistered user, temporarily or permanently, no service can be provided for this unregistered user. However, some services like voice mail box shall also be provided to unregistered users.

Currently it is possible to re-assign an S-CSCF to the IMS user when this user tries to register with the IMS via a SIP REGISTER request sent to the S-CSCF. In this case the registration status of the user is changed and therefore this is not a solution for an unregistered user. In addition there are IMS users who do not register with the IMS at all, e.g. the so-called Public Service Identity (PSI), which represents a service identity.

Further problem in the current IMS is that an I-CSCF can only select an S-CSCF for an IMS user when it receives a non-REGISTER request (e.g SIP INVITE request to initiate a session) and when no S-CSCF is currently assigned to the user. In this case the HSS returns the Server Capabilities of the user to the I-CSCF. The I-CSCF will then select an S-CSCF for the user according to the capabilities, from a list of S-CSCFs stored at the I-CSCF.

However, if an S-CSCF has already been assigned to the user, the HSS returns an S-CSCF address to the I-CSCF using Diameter Location-Info-Answer message (LIA) response. In this case no S-CSCF re-selection is allowed for an I-CSCF. Therefore, when the currently assigned S-CSCF for the user is not available, the I-CSCF cannot re-select another S-CSCF for the user but the I-CSCF must reject the request. Even if the I-CSCF would try to re-select an S-CSCF for the IMS user, the HSS rejects the re-assignment.

S-CSCF assignment to an unregistered user could be removed via administrative means, after which the I-CSCF selects a new S-CSCF for the user and the selected S-CSCF may download the user profile from the HSS. However, this will usually be done for all users assigned with this S-CSCF and may thereby introduce additional load burst at the HSS, which could lead to an overload situation at the HSS. Furthermore the administrative removal of the S-CSCF assignment will usually involve manual work by the service provider and cause additional costs.

The object of the invention is to overcome the above problems.

SUMMARY OF THE INVENTION

The present invention overcomes the above problem by providing a register entity and a method comprising
  maintaining information about a registration state of users and about assignments of serving entities to the users
  determining if a serving entity is available to serve the users
  receiving a request associated with a user and requesting details of a serving entity assigned to the user
  removing the assignment of the serving entity to the user from the maintained information, responsive to the receiving the request associated with the user if the serving entity has been determined not to be available and if the registration state of the user indicates that the user is not registered.

Register entity may be a Home Subscriber Server (HSS). The request may be received according to Diameter protocol and the requested details may include an address of a Serving Call State Control Function currently assigned to the user. Determination the availability may be done by monitoring the availability of the serving entity and may happen over Cx interface of an IP Multimedia Subsystem (IMS) network. The user may be a user of an IP Multimedia Subsystem (IMS) network and the assigned serving entity may be a Serving Call State Control Function (S-CSCF) of an IMS network. Register entity and method may comprise transmitting capability requirements for a new serving entity in a response message to the received request if the assignment of the serving entity to the user is removed.

Also a communication system is provided, the communication system has a register entity described above and a control entity that is comprising
  storing information about capabilities of plurality of serving entities selectable to serve users
  receiving capability requirements for a serving entity to be selected to serve a user
  selecting, based on the received capability requirements and the stored capabilities of the plurality of serving entities, a first serving entity from the plurality of serving entities to serve the user and
  determining that the first serving entity is not available to serve users and wherein the control entity re-selects based on the received capability requirements and the stored capabilities of the plurality of serving entities, a second serving entity to serve the user if the first serving entity is determined not to be available to serve the user.

The control entity in the communication system may comprise transmitting a request from the user towards the first serving entity and wherein the request is re-transmitted towards the second serving entity responsive to the (re-)selection of the second serving entity. The control entity may be implementing functions of an Interrogating Call Session Control Function of an IP Multimedia Subsystem (IMS) network. The control entity in the communication system may determine that the first serving entity is not available if no response is received to the transmitted request. The control entity may block, for a period of time, selection of the first serving entity for the user or for another user in response to the determination that the first serving entity is not available to serve the user.

The present invention has the advantage that it provides an automatic mechanism of S-CSCF failover to unregistered IMS users. No involvement of service staff of operators is required. Therefore no additional operative costs will be generated. Further benefit is that the failover procedure only takes place when a request for an unregistered IMS user arrives. This avoids a possible overload situation at the HSS caused by the administrative removal of the S-CSCF, where a flood of requests may be sent from the HSS to the previously assigned S-CSCF to remove the assignment. In addition, the existing Cx and Mw interfaces are used without any changes thereby the solution can work with any standard compliant third party IMS products. The invention may also be brought to the 3GPP as a backwards compatible enhancement for the HSS and I-CSCF behavior.

DETAILED DESCRIPTION OF THE INVENTION

Figure 1:
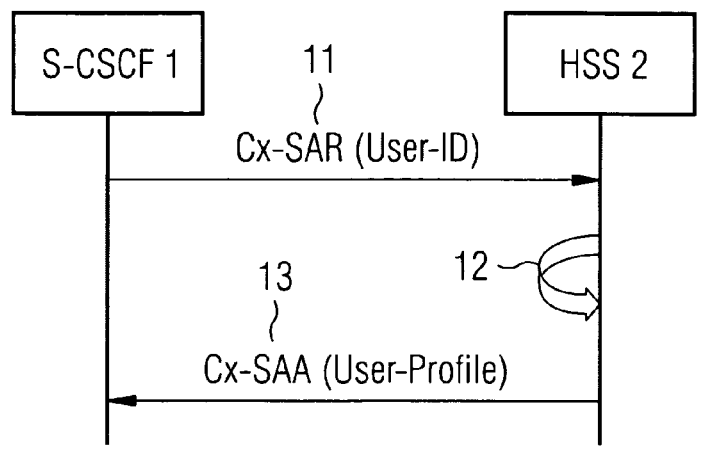
FIG. 1 illustrates a known procedure to assign an S-CSCF to an unregistered user via IMS Cx-interface

Currently, as shown in FIG. 1, the assignment of the S-CSCF 1 to an unregistered user happens after the first SIP request (not shown in FIG. 1) arrives at an S-CSCF 1. The S-CSCF 1 treats the user as an unregistered user and initiates the process to download the user profile from the HSS 2 using Server-Assignment-Request (SAR) in step 11. If no S-CSCF has been assigned to this user, the HSS 2 assigns the S-CSCF 1 to this user in step 12. Finally the HSS 2 provides the user profile to the S-CSCF 1 in Server-Assignment-Answer (SAA) response in step 13.

Figure 2:
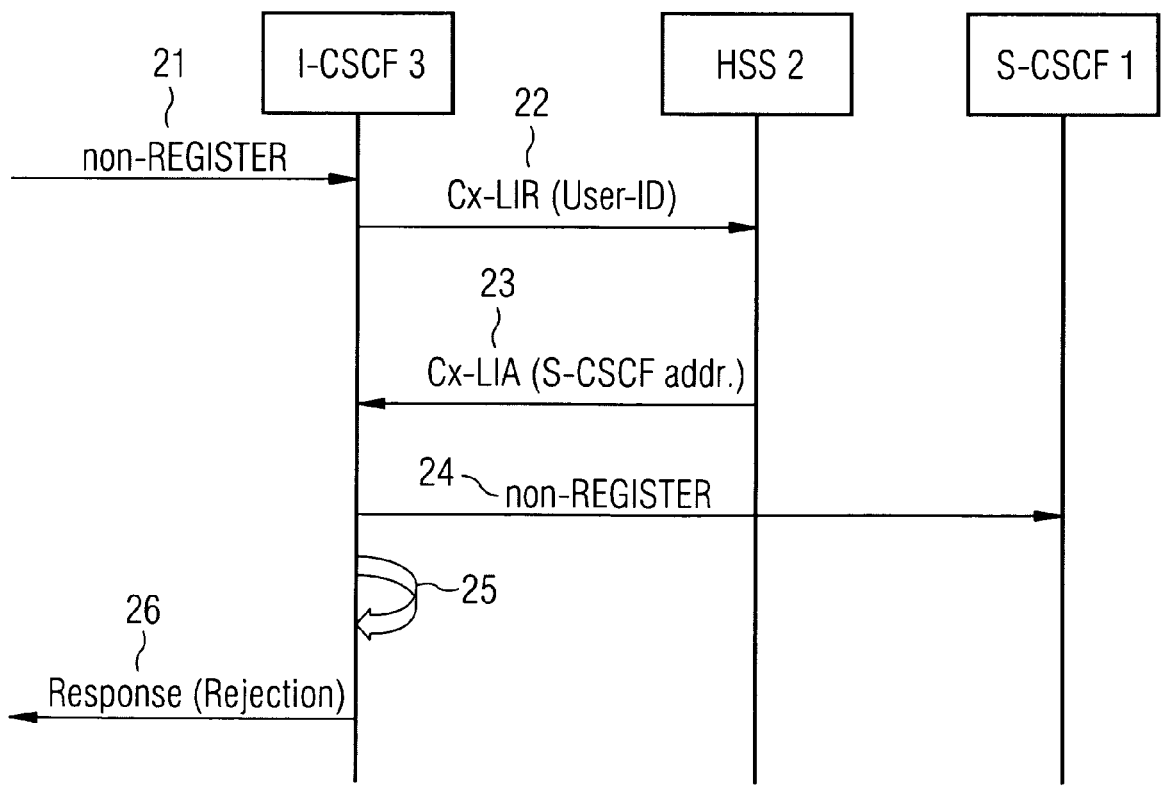
FIG. 2 presents a known situation when an assigned S-CSCF is not available.

FIG. 2 presents prior art S-CSCF assignment from I-CSCF point of view. In step 21, a SIP request (e.g. SIP INVITE, SIP MESSAGE) is transmitted from a user to the I-CSCF 3. The SIP request 21 must not be a REGISTER request. The I-CSCF 3 now needs to find out which S-CSCF (if any) has been assigned to the user, therefore, in step 22, the I-CSCF 3 sends a Cx-LIR command to the HSS 2 to request the address of the S-CSCF that is currently serving the user. In step 23, the HSS 2 returns to the I-CSCF 3 in Cx-LIA command the address of the S-CSCF 1 that is currently assigned to the user according to the HSS 2 database. In step 24, the I-CSCF 3 forwards the SIP request to the S-CSCF 1. In step 25, the I-CSCF 3 determines that the S-CSCF 1 is not available for providing the service (e.g. no response is received from S-CSCF 1) and rejects the original request by sending a response message in step 26. In a normal situation, when the S-CSCF 1 was available for providing the service, a positive SIP response message would be transmitted from the S-CSCF 1 to the I-CSCF 3 after step 24.

Figure 3:
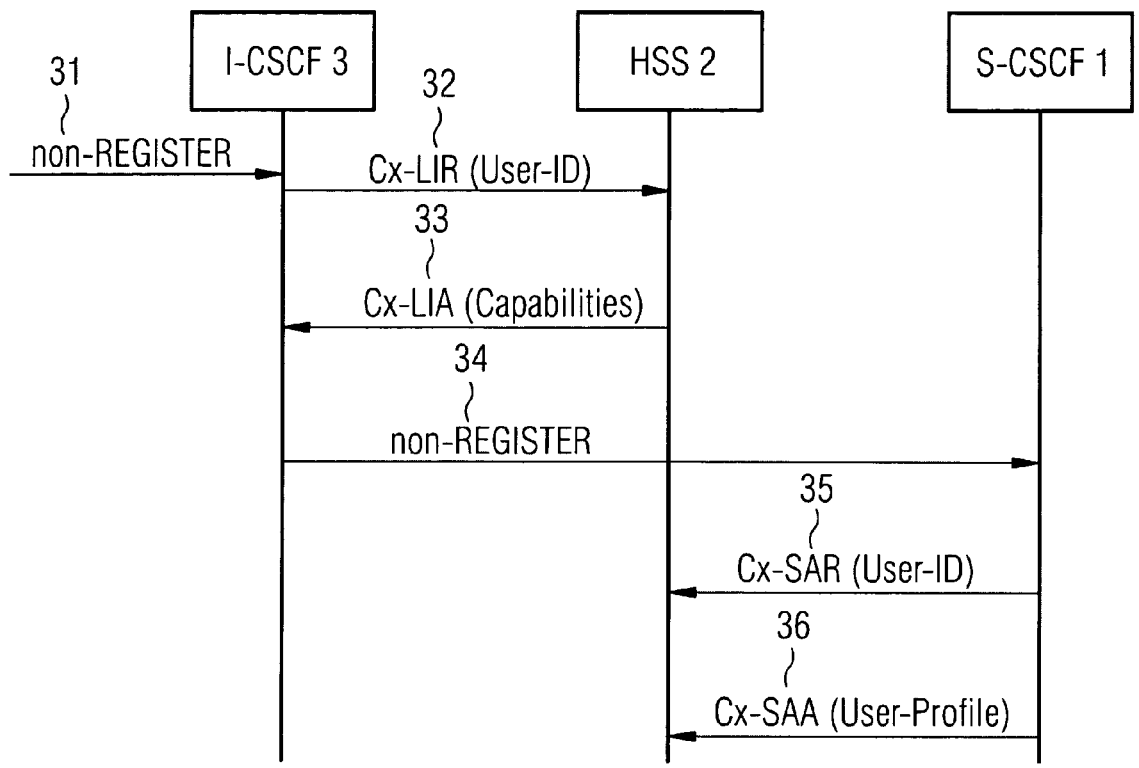
FIG. 3 presents a known procedure where an S-CSCF is selected by the I-CSCF and assigned to the unregistered IMS user in HSS.

FIG. 3 presents prior art S-CSCF assignment from I-CSCF point of view when no S-CSCF has been assigned for the user. Steps 31 and 32 corresponds to steps 21 and 22 in FIG. 2. Since no S-CSCF has been assigned to the user, the HSS 2 returns in step 33 to the I-CSCF 3 server capabilities which are input for the I-CSCF 3 when selecting an S-CSCF. The IMS Server Capabilities are the set of capabilities that the S-CSCF to be selected for the user has to fulfill. The I-CSCF 3 selects an S-CSCF (here S-CSCF 1) for the user from a list of S-CSCFs stored at the I-CSCF 3 according to the capabilities. In step 34, the I-CSCF 3 forwards the SIP request to the selected S-CSCF 1. Steps 35 and 36 corresponds to steps 11 and 13 in FIG. 1.

In this section the S-CSCF assignment process for a user is described in more detail. When a User Equipment (UE) attaches and makes itself available for access to IMS services by explicitly registering in the IMS, an S-CSCF shall be assigned to serve the UE. The selection of an S-CSCF is performed in the I-CSCF. For example, the following information is needed in the selection of the S-CSCF:

Required capabilities for user services, provided by the HSS.

Operator preference on a per-user basis, provided by the HSS.

Capabilities of individual S-CSCFs in the home network. This is internal information within the operator's network and may be used in the S-CSCF selection.

Topological information of where the S-CSCF is located. This is internal information within the operator's network and may be used in the S-CSCF selection.

In order to support the S-CSCF selection described above and to allow the S-CSCF to perform its tasks, the Cx interface must support transferring following information:

transfer of CSCF-UE security parameters from HSS to CSCF. The security parameters allow the CSCF and the UE to communicate in a trusted and secure way.

transfer of service parameters of the subscriber from HSS to CSCF. This may include e.g. service parameters, Application Server (AS) address, triggers, information on subscribed media etc. The information on subscribed media is provided in the form of a profile identifier; details of the allowed media parameters associated with the profile identifier are configured in the S-CSCF.

transfer of CSCF capability information from HSS to CSCF. This may include e.g. supported service set, protocol version numbers etc.

transfer of session signalling transport parameters from CSCF to HSS. The HSS stores the signalling transport parameters and they are used for routing mobile terminated sessions to the Serving-CSCF. The parameters may include e.g. IP-address and port number of CSCF, transport protocol etc. The information mentioned above shall be transferred before the CSCF is able to serve the user. It shall also be possible to update this information while the CSCF is serving the user, for example if new services are activated for the user.

In the following, preferred embodiments of the present invention are described with reference to the accompanying drawings. It should, however, be understood that this description is for illustrative purposes only and that the present invention is by no means to be construed as being limited to the embodiments described and illustrated.

According to the first embodiment of the invention, the HSS 2 shall monitor the availability of S-CSCFs and remove the assignment of an unavailable S-CSCF to an unregistered IMS user when Cx-LIR query is received for that user.

The HSS may monitor the availability of S-CSCFs by various means, for example over standard Cx interface, e.g. using the connection state (close or open) for the Diameter connection between the HSS and each S-CSCF, or by sending a Cx-PPR request containing unchanged user profile to each S-CSCF. Lack of appropriate response to from the S-CSCF may be interpreted as the S-CSCF is not available. If an S-CSCF assigned to an unregistered IMS user is not available, the HSS shall remove the S-CSCF assignment so that a new S-CSCF may be selected by the I-CSCF for the unregistered IMS user as described in connection with FIG. 3 before. To avoid possible load burst caused by removal of the S-CSCF assignment for all unregistered IMS users assigned to the unavailable S-CSCF, the HSS shall only remove the assignment when the I-CSCF receives a non-REGISTER request for the unregistered user and queries the HSS about the assigned S-CSCF for that user. Removal of the assignment only at this phase avoids also possible unnecessary removals of the assigned S-CSCFs if the unavailable S-CSCF becomes available later; thereby no removal of S-CSCF assignment is necessary at all.

Figure 4:
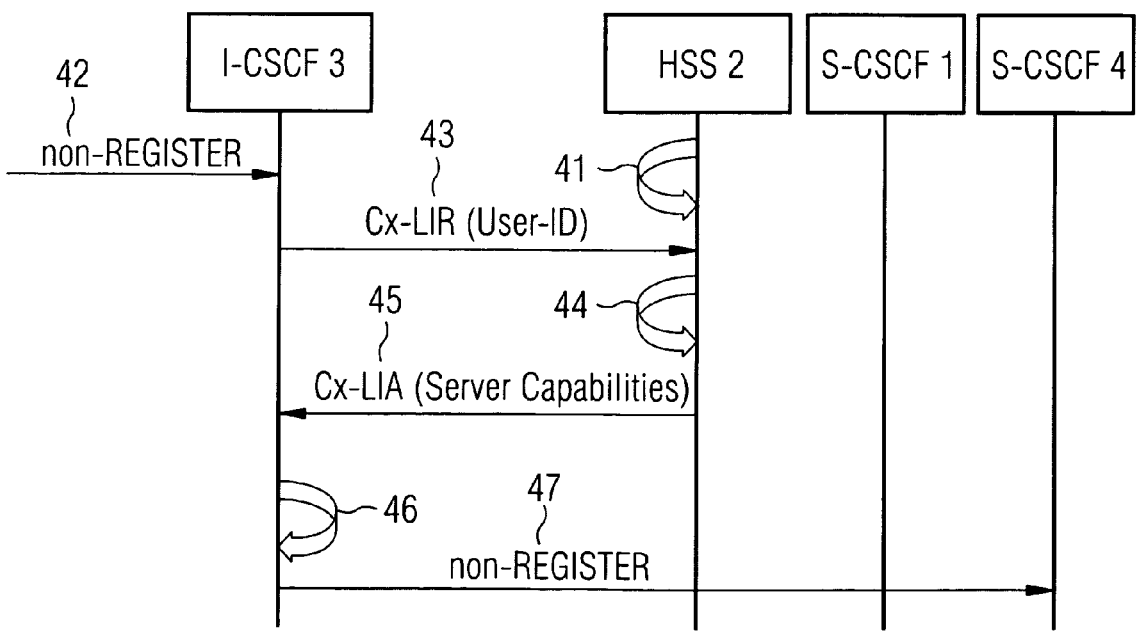
FIG. 4 presents the first embodiment of the invention where the HSS removes the assignment of an unavailable S-CSCF to an unregistered IMS user when receiving a server query for the user.

FIG. 4 presents the signaling flow of above embodiment. The S-CSCF 1 is currently assigned to a user (assignment not shown in FIG. 4). In step 41, the HSS 2 monitors the availability of S-CSCFs in the IMS network, including the S-CSCF 1 and the S-CSCF 4 and at some point determines that the S-CSCF 1 is no longer available for serving users. The monitoring may happen through means explained in the previous section or by other known means. In steps 42, a new SIP request from a user is transmitted to the I-CSCF 3 which, in step 43, requests from the HSS 2 an address of the S-CSCF that is serving the user, as already described in FIG. 3 steps 31 and 32. After receiving the Cx-LIR query 43, the HSS 2 detects that the S-CSCF 1 which is currently being assigned to the user has been determined not to be available, and thereby, instead of returning S-CSCF 1 address to the I-CSCF 3, the HSS 2, in step 44, removes the S-CSCF 1 assignment for the user in the HSS 2 database, and in step 45 returns server capabilities to the I-CSCF 3 thereby enabling I-CSCF 3 to select a new S-CSCF to serve the user. In step 46, the I-CSCF 3 selects the S-CSCF 4 from a list of S-CSCFs stored at the I-CSCF 3 and according to the server capabilities and finally, in step 47, forwards the SIP request to the S-CSCF 4.

Figure 6:
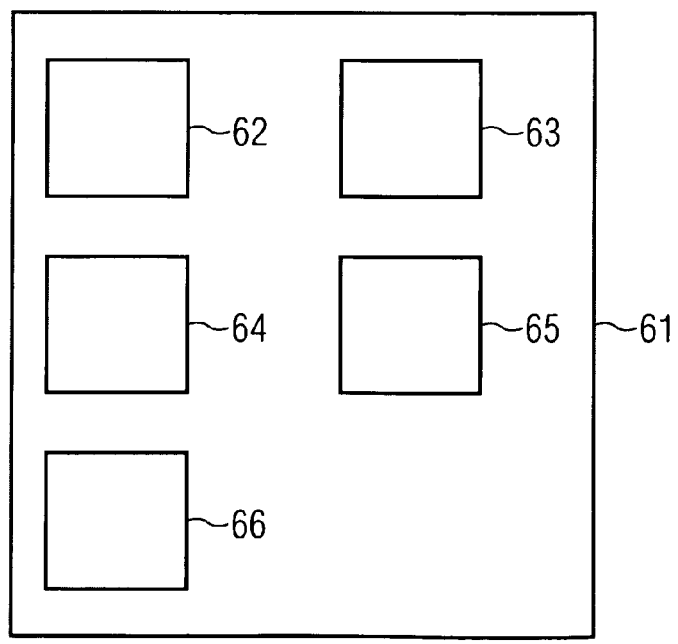
FIG. 6 presents the internal structure of HSS implementing the first embodiment of the invention where the HSS removes the assignment of an unavailable S-CSCF to an unregistered IMS user when receiving a server query associated with the user.

FIG. 6 presents the functional structure of a register entity, for example HSS, which may implement the first embodiment of the invention. The HSS 61 comprises a maintaining unit 62 that is maintaining registration and subscription information of users of the IMS network. The maintained information may include registration state of users of the network and assignments of S-CSCFs to the users. The HSS also comprises determining unit 63 that determines if S-CSCFs of the network are currently available for serving the users. The determination unit 63 may actively, e.g. at certain intervals, monitor the availability of S-CSCFs for example over standard Cx interface, using the connection state for the Diameter connection between the HSS and each S-CSCF, or by sending a Cx-PPR request containing unchanged user profile to each S-CSCF. Lack of appropriate response from the S-CSCF is interpreted by the determination unit 63 to mean that the S-CSCF in question is not available. Receiving unit 64 is receiving from I-CSCFs requests (e.g. Diameter Cx-LIR query) associated with users and requesting details, e.g. IP address, of a serving entity assigned to the user referred in the request. When receiving such a request, assignment unit 65 is checking if the S-CSCF that is currently assigned in the maintaining unit 62 to the user has been determined by the determination unit 64 not to be available. If that is the case, the assignment unit 65 removes the assignment of the S-CSCF to the user in the maintaining unit 62, if the registration state of the user in the maintaining unit 62 is indicating that the user is currently not registered. Transmitting unit 66 is transmitting a response message to the received request received by the receiving unit 64. If, according to the maintaining unit 62, no S-CSCF is assigned to the user referred in the request, the transmitting unit 66 is transmitting in the response message Server Capabilities for a new S-CSCF. According to this embodiment of the invention, if the assignment unit 65 has removed from the maintaining unit 62 the assignment of the S-CSCF to the user, the transmitting unit 66 returns to the I-CSCF Server Capabilities parameter instead of the address of the S-CSCF which was previously assigned to the user but which is now determined by determination unit 63 to be unavailable for serving the users of the IMS network.

In the second embodiment of the invention, the situation is improved by introducing the S-CSCF re-selection procedure in the I-CSCF when the previously selected S-CSCF is unavailable. When the I-CSCF 3 selects an S-CSCF 1 for the IMS user, it may happen that the selected S-CSCF is not available; however, the I-CSCF 3 may still not be aware of the unavailability of the S-CSCF. As shown already in steps 25 and 26 of FIG. 2, the I-CSCF 3 must reject the SIP request if no service or response is received from the selected S-CSCF. According to this embodiment of the invention, the I-CSCF shall try at least one other S-CSCFs if the originally selected S-CSCF is unavailable. In one aspect of the invention the I-CSCF shall check that the newly selected S-CSCF is not one of any S-CSCFs selected previously for the same SIP request. In further aspect of the invention the I-CSCF shall only reject the SIP request if all S-CSCFs are unavailable for the request.

Figure 5:
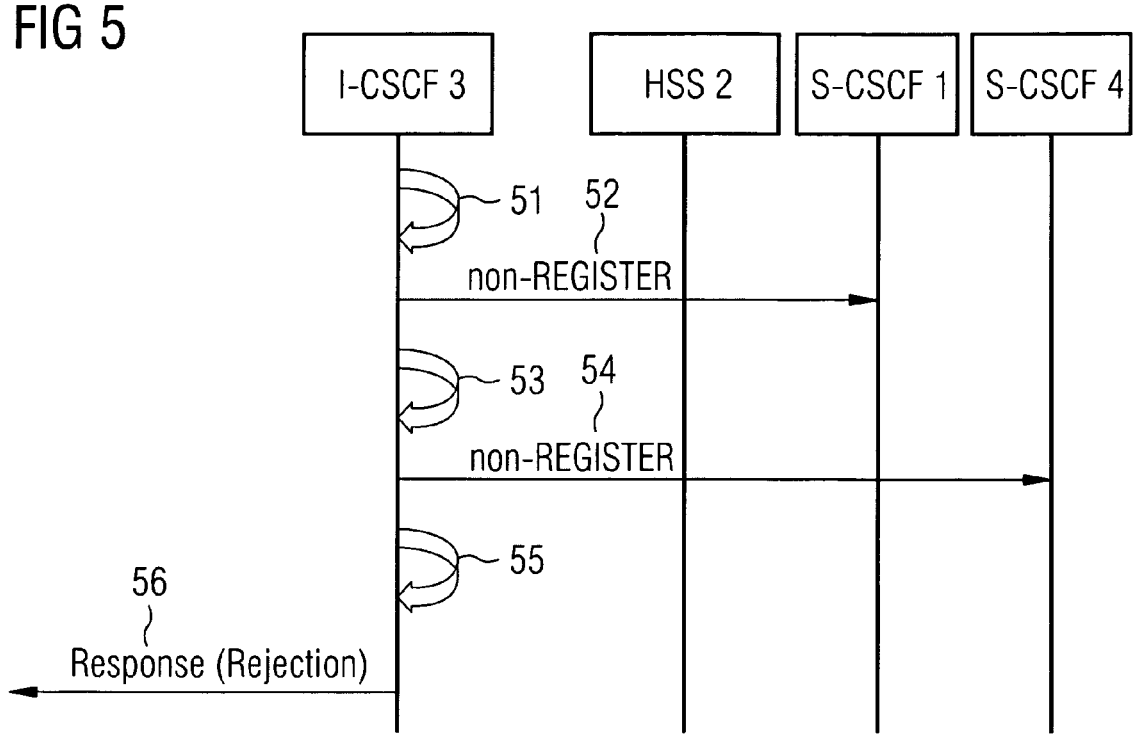
FIG. 5 presents the second embodiment of the invention where the I-CSCF may re-select alternative S-CSCFs for a SIP request, when the previously selected one is not available.

FIG. 5 presents the signaling flow and functions of the above embodiment. In step 51, the I-CSCF 3 selects the S-CSCF 1 to serve a user, for example, because the HSS 3 has earlier returned Server Capabilities in Cx-LIA request as shown and explained in FIG. 4 (in this case, step 51, correspond to step 46 in FIG. 4). Next, in step 52, the I-CSCF 3 forwards the SIP request to the selected S-CSCF 1, which however, does not respond as it should do in normal operation. Thereby, in step 53, the I-CSCF 3 finally determines that the selected S-CSCF 1 is not available for serving the user and the I-CSCF 3 makes a new S-CSCF selection using the Server Capabilities as described before. In FIG. 5 example, the S-CSCF 4 is selected as the result of the re-selection. In step 54, the I-CSCF 3 forwards the SIP request to the S-CSCF 4 which, if available, acknowledges the SIP request and starts serving the user according to known IMS procedures (not shown the FIG. 5). However, if also this S-CSCF 4 is determined not to be available the re-selection process may be repeated in the I-CSCF 3 as long as potential new S-CSCFs are available on the S-CSCF list stored at I-CSCF 3. After unsuccessfully trying several or all S-CSCFs, the I-CSCF 3 may decide, in step 55, that no service can be provided by the IMS network, and to reject the request in step 56.

In one aspect of the invention, after determining that an S-CSCF is not available, the I-CSCF may black-out the unavailable S-CSCF for a certain period of time to avoid unnecessary traffic to the unavailable S-CSCFs. In this aspect of the invention, the I-CSCF marks this particular S-CSCF as unavailable and may stop selecting this S-CSCF for serving new users and thereby stop forwarding any SIP request to it for a certain black-out period. After the black-out period has ended, the I-CSCF may try the unavailable S-CSCF again and the S-CSCF be removed from the black-out list if it is available again. Inclusion of an S-CSCF on the black out list may be caused, for example, by lack of appropriate SIP response from the S-CSCF or by receiving a response according to which the S-CSCF is not capable for providing the service.

Figure 7:
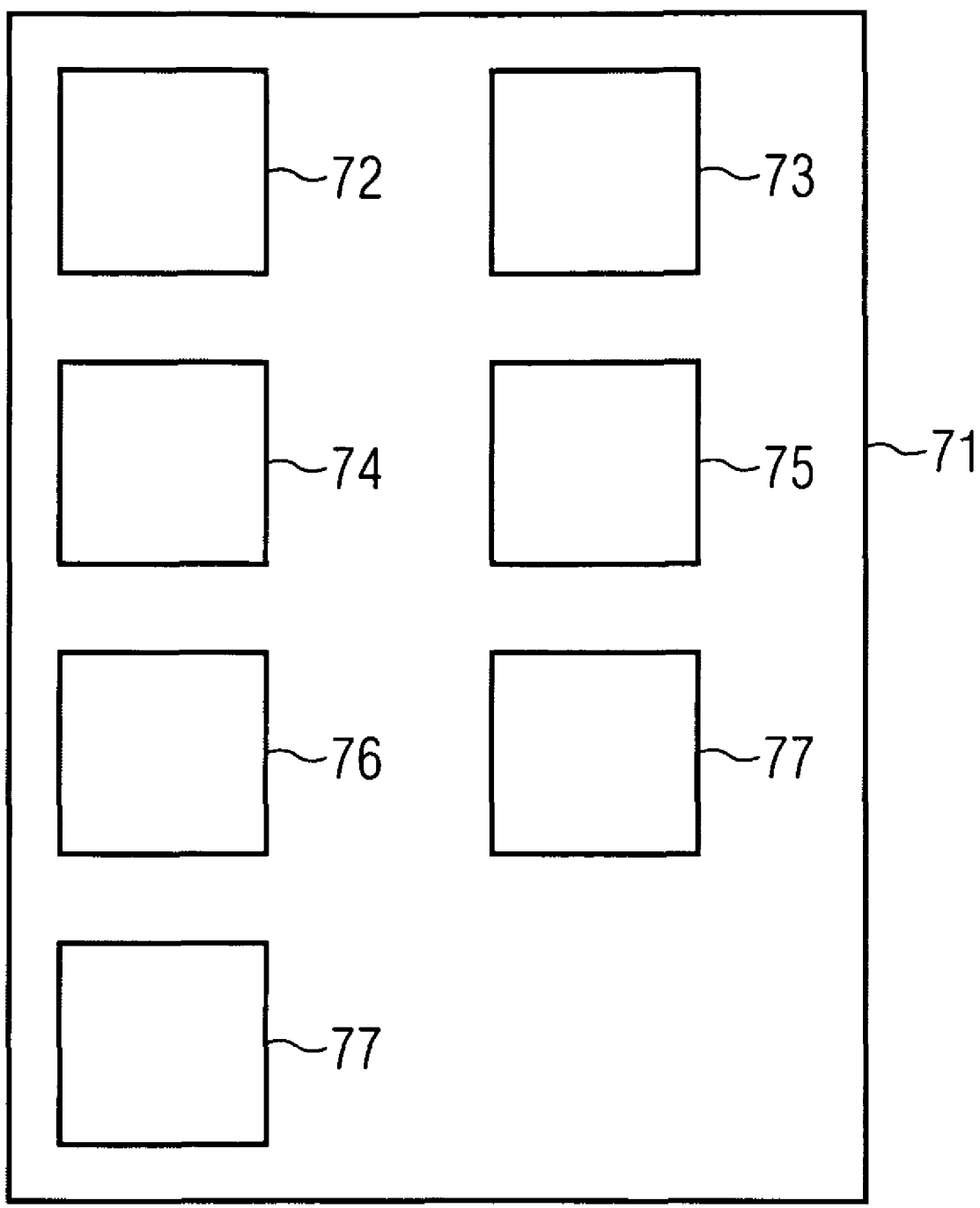
FIG. 7 presents the internal structure of I-CSCF implementing the second embodiment of the invention where the I-CSCF may re-select alternative S-CSCFs for a SIP request, when the previously selected S-CSCF is not available.

FIG. 7 shows the internal structure and functions of a control entity, for example I-CSCF, implementing the second embodiment of the invention. The I-CSCF 71 comprises maintaining unit 72 that maintains a list of S-CSCFs which may be selected for serving users of the IMS network and capabilities of those S-CSCFs. The I-CSCF 71 also comprises a receiving unit 73 that is receiving SIP requests from UEs and Diameter responses from the HSS. The receiving unit 73 receives from the HSS, for example, Server Capabilities parameters for a new S-CSCF to be selected to serve a user. The transmitting unit 74 is transmitting SIP requests to UEs and CSCFs in the IMS network, and Diameter requests to the HSS, for example, to query from the HSS the currently assigned S-CSCF to the user for which a SIP request has been received by the receiving unit 73. Selecting unit 75 is selecting, based on the received Server Capabilities and based on the capabilities of the selectable S-CSCFs in the maintaining unit 72, one of the S-CSCFs which is fulfilling the Server Capabilities requirements set for an S-CSCF to be selected to serve the user. This selected S-CSCF is thereby selected to serve the user and the transmitting unit 74 may transmit SIP requests associated with the user towards the selected S-CSCF. Determining unit 76 is configured to determining whether S-CSCFs are available to serve users. Determining unit 76 may determine that a certain S-CSCF is not available, for example, by recognizing that no response has been received to the request transmitted to the S-CSCF by the transmitting unit 74. Further, if the determining unit 76 is determining that a S-CSCF is or has become unavailable, the selecting means 75 is configured to re-select based on the earlier received Server Capabilities and based on the capabilities of the selectable S-CSCFs in the maintaining unit 72, another S-CSCF from the S-CSCFs which are fulfilling the Server Capabilities requirements set for an S-CSCF to be selected to serve the user whose originally selected S-CSCF has been determined to be unavailable. Transmitting unit 74 may be configured to re-transmit the SIP request for which no response was received from the originally selected S-CSCF towards the second S-CSCF. I-CSCF 71 may optionally comprise a blocking unit 77 which is blocking, for a period of time, the S-CSCF(s) determined to be unavailable from selecting the unavailable S-CSCF for any user during a black-out period of the unavailable S-CSCF in question.

In one aspect of the invention, the second embodiment is implemented together with the first embodiment. This has the benefit that the server capabilities parameter is more often returned from the HSS to the I-CSCF and therefore S-CSCF reselection by the I-CSCF is also more often possible. As explained before, the server capabilities are needed in the I-CSCF for doing the S-CSCF reselection, however, whether or not the I-CSCF obtains the server capabilities depends of the behavior of the HSS. Implementing the first embodiment in the HSS together with the second embodiment in the I-CSCF causes the HSS returning the server capabilities more frequently to the I-CSCF, in particular in the case there is a potential problem in the IMS network in S-CSCF assignment or S-CSCF selection, thereby further improving the service level of the IMS network.

With this invention, a new S-CSCF may be assigned to an unregistered IMS user when the one previously selected is not available at the moment a SIP request (non-REGISTER request) is received by the I-CSCF. This enables IMS services to be provided to unregistered IMS user with higher success rate.

The invention is not limited to IMS networks, but may also be applied in other networks supporting server entity selection for users and having similar service control proxy functionality in the network. Therefore, the I-CSCF is only used here as an example of SIP server or control server in general. Functions of the register entity (HSS) and the control entity (I-CSCF) described above may be implemented by code means, as software, and loaded into memory of a computer. The memory or computer-readable medium may be, for instance, a hard disk drive, flash device, random access memory (RAM), tape, or any other such medium used to store data.

I claim:

1. A register entity, comprising:
   a maintaining unit configured to maintain information about a registration state of users and about assignments of serving entities to the users;
   a determining unit configured to determine if a serving entity is available to serve the users;
   a receiving unit configured to receive a request associated with a user and requesting details of a serving entity assigned to the user; and
   an assignment unit configured to remove the assignment of the serving entity to the user from the maintained information, responsive to the receiving the request associated with the user if the serving entity has been determined not to be available and if the registration state of the user indicates that the user is not registered.

2. The register entity according to claim 1, wherein the register entity is a home subscriber server.

3. The register entity according to claim 1, wherein the receiving unit is configured to receive a request according to diameter protocol.

4. The register entity according to claim 1, wherein the user is a user of an IP multimedia subsystem (IMS) network.

5. The register entity according to claim 1, wherein the assigned serving entity is a serving call state control function of an IP multimedia subsystem (IMS) network.

6. The register entity according to claim 1, further comprising a transmitting unit configured to transmit capability requirements for a new serving entity in a response message to the received request if the assignment of the serving entity to the user is removed by the assignment unit.

7. A method, comprising:
   maintaining information about a registration state of users and about assignments of serving entities to the users;
   determining if a serving entity is available to serve the users;
   receiving a request associated with a user and requesting details of a serving entity assigned to the user; and
   removing the assignment of the serving entity to the user from the maintained information, responsive to the receiving the request associated with the user if the serving entity has been determined not to be available and if the registration state of the user indicates that the user is not registered.

8. The method according to claim 7, wherein the determining comprises monitoring the availability of the serving entity over Cx interface of an IP multimedia subsystem (IMS) network.

9. The method according to claim 7, wherein the receiving comprises receiving a request according to diameter protocol.

10. The method according to claim 7 wherein the receiving comprises receiving the request requesting the address of a serving call state control function of an IP multimedia subsystem (IMS) network assigned to the user.

11. The method according to claim 7, further comprising:
    transmitting capability requirements for a new serving entity in a response message to the received request if the assignment of the serving entity to the user is removed.

12. A computer program embodied on a non-transitory computer readable medium, the computer program being configured to control a processor to perform:
    maintaining information about a registration state of users and about assignments of serving entities to the users;
    determining if a serving entity is available to serve the users;
    receiving a request associated with a user and requesting details of a serving entity assigned to the user; and
    removing the assignment of the serving entity to the user from the maintained information, responsive to the receiving the request associated with the user if the serving entity has been determined not to be available and if the registration state of the user indicates that the user is not registered.

13. A communication system comprising a register entity of claim 1, wherein the communication system further comprises a control entity comprising
    a storing unit configured to maintain information about capabilities of plurality of serving entities selectable to serve users;
    a receiving unit configured to receive capability requirements for a serving entity to be selected to serve a user;
    a selecting unit configured to select, based on the received capability requirements and the stored capabilities of the plurality of serving entities, a first serving entity from the plurality of serving entities to serve the user; and
    a determining unit configured to determine that the first serving entity is not available to serve users;
    wherein the selecting unit is configured to re-select based on the received capability requirements and the stored capabilities of the plurality of serving entities, a second serving entity to serve the user, responsive to the determination that the first serving entity is not available to serve the user.

14. The communication system according to claim 13, further comprising a transmitting unit configured to transmit a request from the user towards the first serving entity and wherein the transmitting unit is configured to re-transmit the request towards the second serving entity responsive to the re-selection of the second serving entity.

15. The communication system according to claim 13, wherein the control entity is implementing functions of an interrogating call session control function of an IP multimedia subsystem (IMS) network.

16. The communication system according to claim 14, wherein the determining unit is configured to determine that the first serving entity is not available if no response is received to the transmitted request.

17. The communication system according to claim 13, further comprising, at the control entity, a blocking unit for blocking, for a period of time, selection of the first serving entity for the user or for another user in response to the determination that the first serving entity is not available to serve the user.

* * * * *